(12) United States Patent
Raz

(10) Patent No.: US 7,274,853 B2
(45) Date of Patent: Sep. 25, 2007

(54) FIBER GUIDING HELICAL RING

(75) Inventor: Nathan Raz, Haifa (IL)

(73) Assignee: Rafael-Armament Development Authority Ltd., Haifa (IL)

( * ) Notice: Subject to any disclaimer, the term of this patent is extended or adjusted under 35 U.S.C. 154(b) by 13 days.

(21) Appl. No.: 10/512,696

(22) PCT Filed: Jan. 19, 2004

(86) PCT No.: PCT/IL2004/000051

§ 371 (c)(1),
(2), (4) Date: Oct. 27, 2004

(87) PCT Pub. No.: WO2004/065991

PCT Pub. Date: Aug. 5, 2004

(65) Prior Publication Data

US 2005/0173587 A1    Aug. 11, 2005

(30) Foreign Application Priority Data

Jan. 19, 2003    (IL)    ..................................... 154025

(51) Int. Cl.
*G02B 6/00*    (2006.01)

(52) U.S. Cl. ........................ 385/137; 385/134; 385/147
(58) Field of Classification Search .............. 242/602.2
See application file for complete search history.

(56) References Cited

U.S. PATENT DOCUMENTS

| 806,748 | A | * | 12/1905 | Nelson | ..................... 242/602.2 |
| 2,599,926 | A | * | 6/1952 | Le Bus | ..................... 242/602.2 |
| 2,620,996 | A | * | 12/1952 | Le Bus | ..................... 242/602.2 |
| 2,892,598 | A | * | 6/1959 | Dudley | ..................... 242/602.2 |
| 4,995,698 | A | * | 2/1991 | Myers | ........................ 385/147 |
| 5,029,960 | A | * | 7/1991 | Hulderman et al. | ........ 385/134 |
| 5,181,270 | A | * | 1/1993 | Hsu et al. | ................... 385/134 |
| 5,607,532 | A |   | 3/1997 | LoStracco | |
| 6,073,917 | A | * | 6/2000 | Plummer | .................... 254/389 |

* cited by examiner

*Primary Examiner*—Sung Pak
(74) *Attorney, Agent, or Firm*—Mark M. Friedman

(57) ABSTRACT

An apparatus and method for winding an optical fiber of arbitrary diameter on a smooth conical bobbin. The apparatus includes a slotted helical ring (148) attachable to, or integrated with a bobbin, the ring used to guide a fiber (152) in its initial first turn in the winding. After the first turn, the winding of a base layer and subsequent layers is achieved without needing a grooved bobbin surface.

4 Claims, 3 Drawing Sheets

SECTION B-B

SECTION C-C

FIBER GUIDING HELICAL RING

FIELD AND BACKGROUND OF THE INVENTION

The present invention relates to optical fibers used in optically guided airborne bodies such as air-to-ground or ground-to-ground missiles. More specifically, the present invention relates to an apparatus for winding such a fiber on a smooth bobbin.

Optical fiber dispensers are used for communication between a launcher, such as an airborne platform that carries the dispenser and from which the dispenser "pays out" the optical fiber, and a remotely operated object such as a remotely operated missile. The optical fiber is wound on a bobbin, which is normally pre-grooved on its external surface, the grove used to guide the winding of a first bottom layer of the fiber. A detailed description of a prior art dispenser is given for example in U.S. Pat. No. 5,607,532 to LoStracco. For proper, smooth and faultless functioning of the payout, it is necessary that throughout the payout operation the residual pack, i.e. that part of the optical fiber spool that is still on the bobbin, must riot loosen so that each turn of fiber remains in place in its original, slightly tensioned state until payout. The payout may be quite rapid, with speeds higher than 20 m/sec.

An optical fiber is made of at least two different materials, a fused silica inner part which guides the light and an elastomer coating. During winding of the optical fiber on the bobbin an adhesive is applied among the layers of the pack and between the bottom layer and the bobbin. In this way the individual turns of fiber in the pack are fixed so as to ensure that no loosening occurs prior to, and during the payout. The winding action and geometry may themselves cause problems such as optical losses due to micro-bends formed between crossing sections, pressure or tension.

FIG. 1 shows a typical prior art bobbin 10 with a wound fiber 20. For simplicity, only a partial first fiber layer is shown. The bobbin is normally a slightly conical tubular structure that includes a pre-grooved tube 22 having a front end 24 and an aft end 26, with an incline a of about 1-8° along its length axis 28 causing the aft end to have a slightly smaller diameter than the front end. The pre-grooved external surface of the tube includes a helical screw groove 30 for holding and guiding the winding of a first base-layer 32 of fiber 20. The grooves are defined by a pitch P (center-to-center distance of two adjacent grooves) and a depth D. Once the pitch is chosen, fiber 20 must have a slightly smaller (by a few micrometers) diameter to fit in. Thus, typical pre-grooved bobbins can accommodate only fibers of a certain diameter.

Since the use of a pre-grooved tube limits the fiber that can be wound on the bobbing to a fiber with a given diameter tolerance, there is a clear advantage in providing a bobbin that is not pre-grooved. Such a smooth bobbin can then be used for winding fibers with a larger range of diameters, in addition to the saving involved in not needing to pre-groove the bobbin.

SUMMARY OF THE INVENTION

According to the present invention there is provided a helically guiding ring having an external circumferential surface and two substantially parallel side surfaces and attachable to a smooth bobbin, comprising a guiding slot formed in the external circumferential surface and a guiding path formed in one of the side surfaces and joining the guiding slot, whereby the ring is operative to guide the winding of a fiber of given diameter on the smooth bobbin.

According to the present invention there is provided a system for guiding a fiber with a given diameter in a helical path around a smooth surface, comprising a slotted helical ring and a conical bobbin having a smaller diameter aft end and a larger diameter front end, the slotted helical ring attached to the bobbin at the aft end, whereby the fiber can be inserted in the slot starting at the ring aft end and guided by the ring and the smooth surface to form a helical winding around the smooth surface.

According to the present invention there is provided a method of guiding the winding of a fiber around a smooth conical surface, comprising the steps of providing a helically guiding ring, the ring attachable to the smooth conical surface, and using the helically guiding ring and the smooth conical surface for guiding the winding of the fiber around the smooth conical surface.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention describes an apparatus and method for winding an optical fiber of arbitrary diameter on a smooth bobbin. The apparatus includes a slotted helical ring attachable to, or integrated with a bobbin, the ring used to guide a fiber in its initial first turn in the winding. After the first turn, the winding of a base layer and subsequent layers is achieved without needing a grooved bobbin surface. The principles and operation of the apparatus of the present invention may be better understood with reference to the drawings and the accompanying description.

Figure 1:
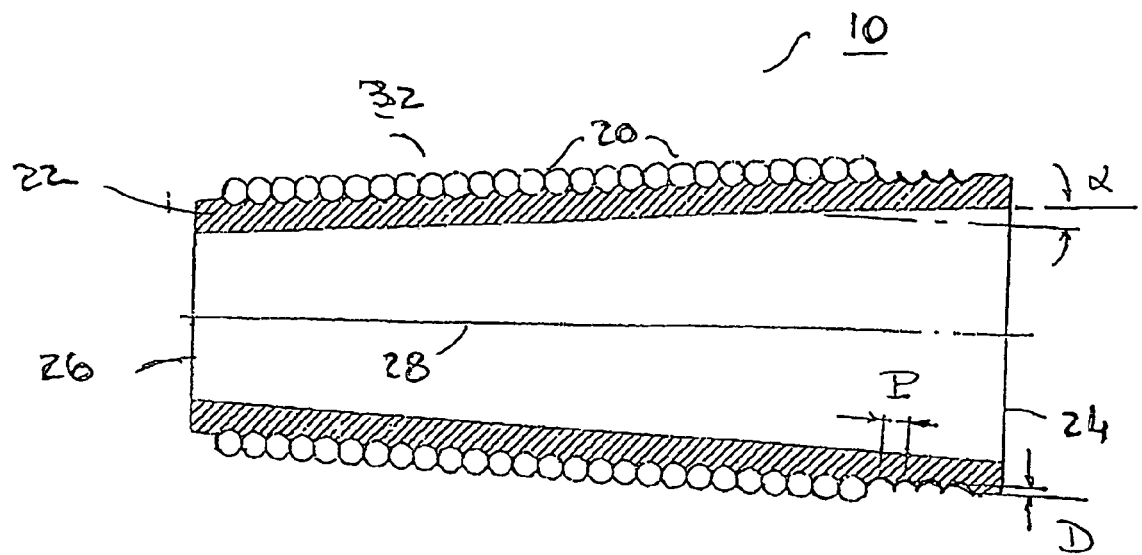
FIG. 1 shows in cross-section a typical prior art pre-grooved bobbin with wound fiber.
Figure 2:
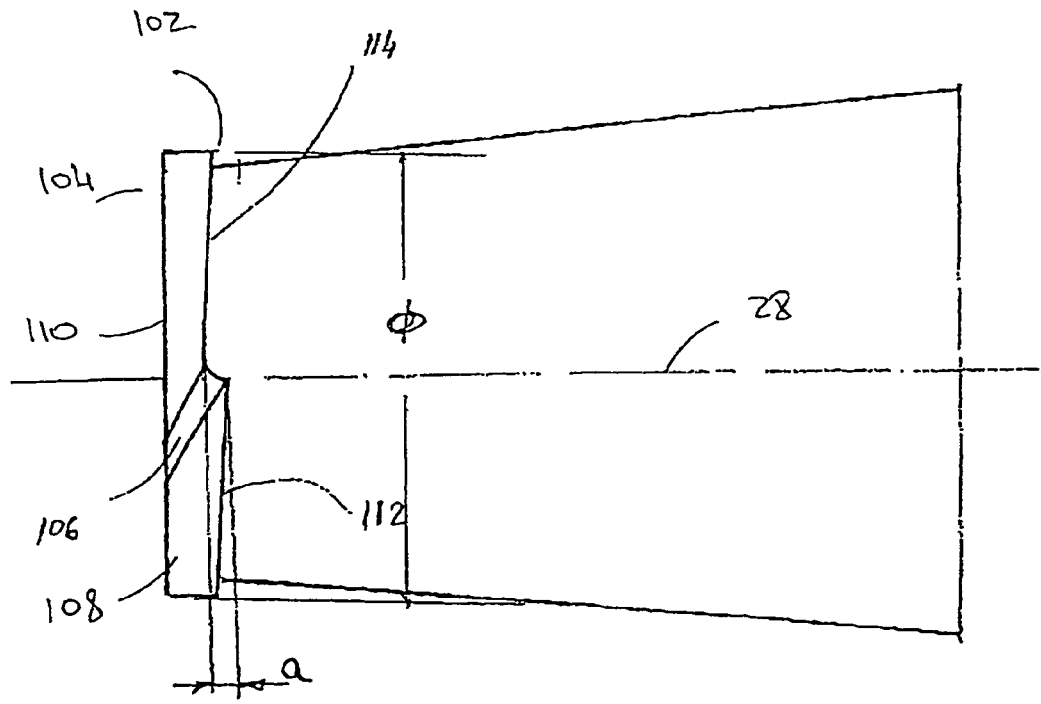
FIG. 2 shows an embodiment of a slotted helical ring according to the present invention attached to a smooth bobbin.

Referring now back to the figures, FIG. 2 shows an embodiment of a smooth conical bobbin 100 having attached to it at an aft end 102 a slotted, fiber-guiding helical ring 104 having an inclined guiding slot 106 impressed into an external circumferential surface 108. Slot 106 runs from an external (farther from the bobbin) planar surface 110 to an internal (closer to the bobbin) surface 112, where it smoothly joins a helical path 114 with a pitch a". The ring symmetry axis is parallel to bobbin axis 28. Some details, such as slot 106 and helical path 114 are shown exaggerated and not to scale.

Ring 104 has an external diameter Φ larger than that of aft end 26 by up to 1 mm, and most typically by 1-2 fiber diameters. Thus, for typical optical fibers with 250 μm diameter, the external ring diameter does not present any obstacle to fiber payout, down to the last layers on the bobbin. Typically, the payout of such fibers never reaches the last layers (closest to the bobbin), since this may cause fiber breaks.

Figure 3:
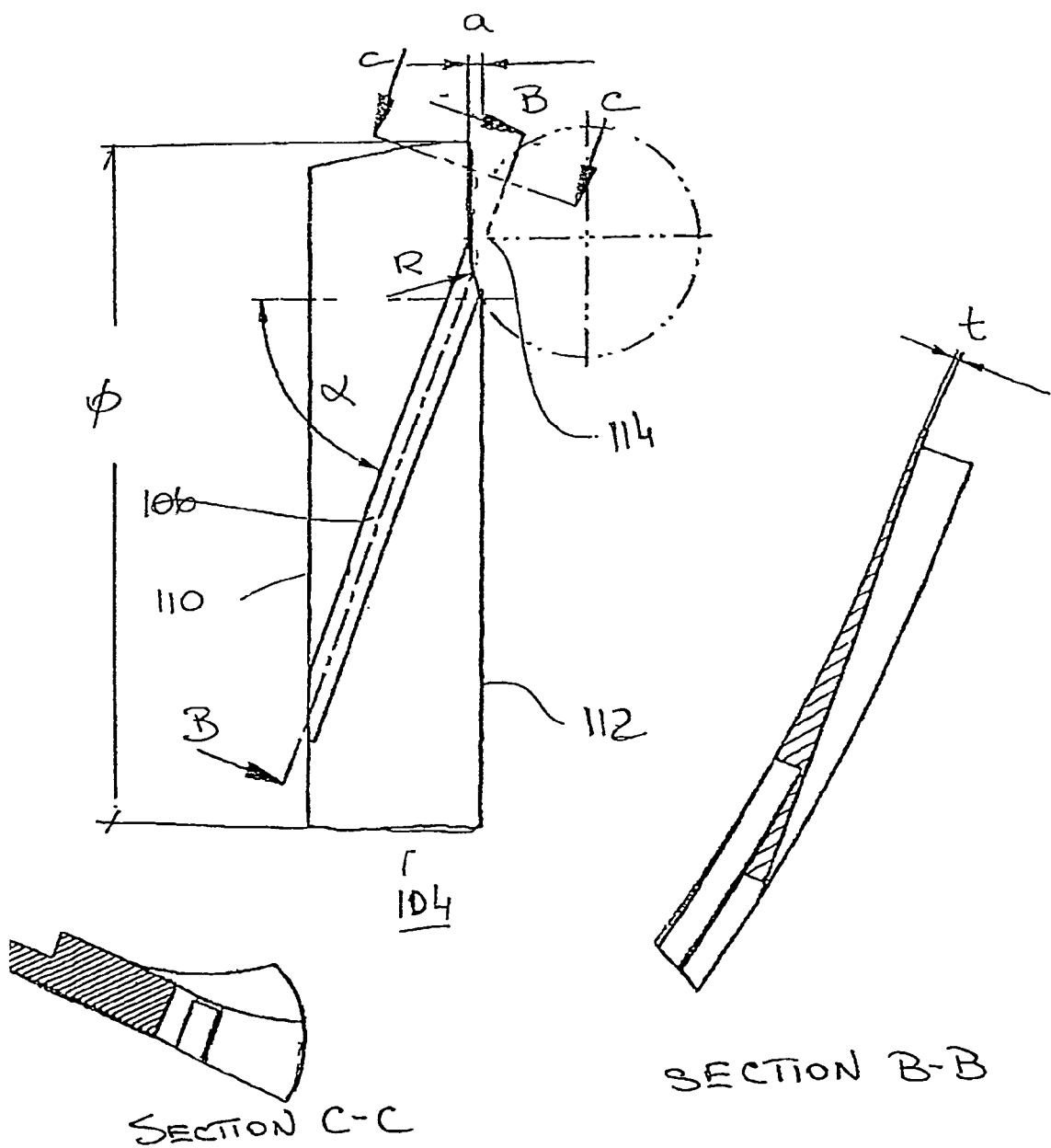
FIG. 3 shows details of slotted helical ring of the present invention.

FIG. 3 details of the slotted area of ring 104(a) as well as two sections B-B and C-C as indicated. The main function of slot 106 is to guide a fiber into helical path 114. Accordingly slot 106 has a width similar to pitch "a" and on the scale of the fiber diameter and a depth into the ring fit to accommodate the fiber. For example, for 250 μm diameter fibers, pitch "a" is around a=0.25 mm. The slot incline angle α can vary in a wide range, preferably between 50-80° and most preferably around 70°, while the wall thickness t in section B-B can be between 0.05 and 0.2 mm, and preferably 0.1±0.05 mm.

Figure 4:
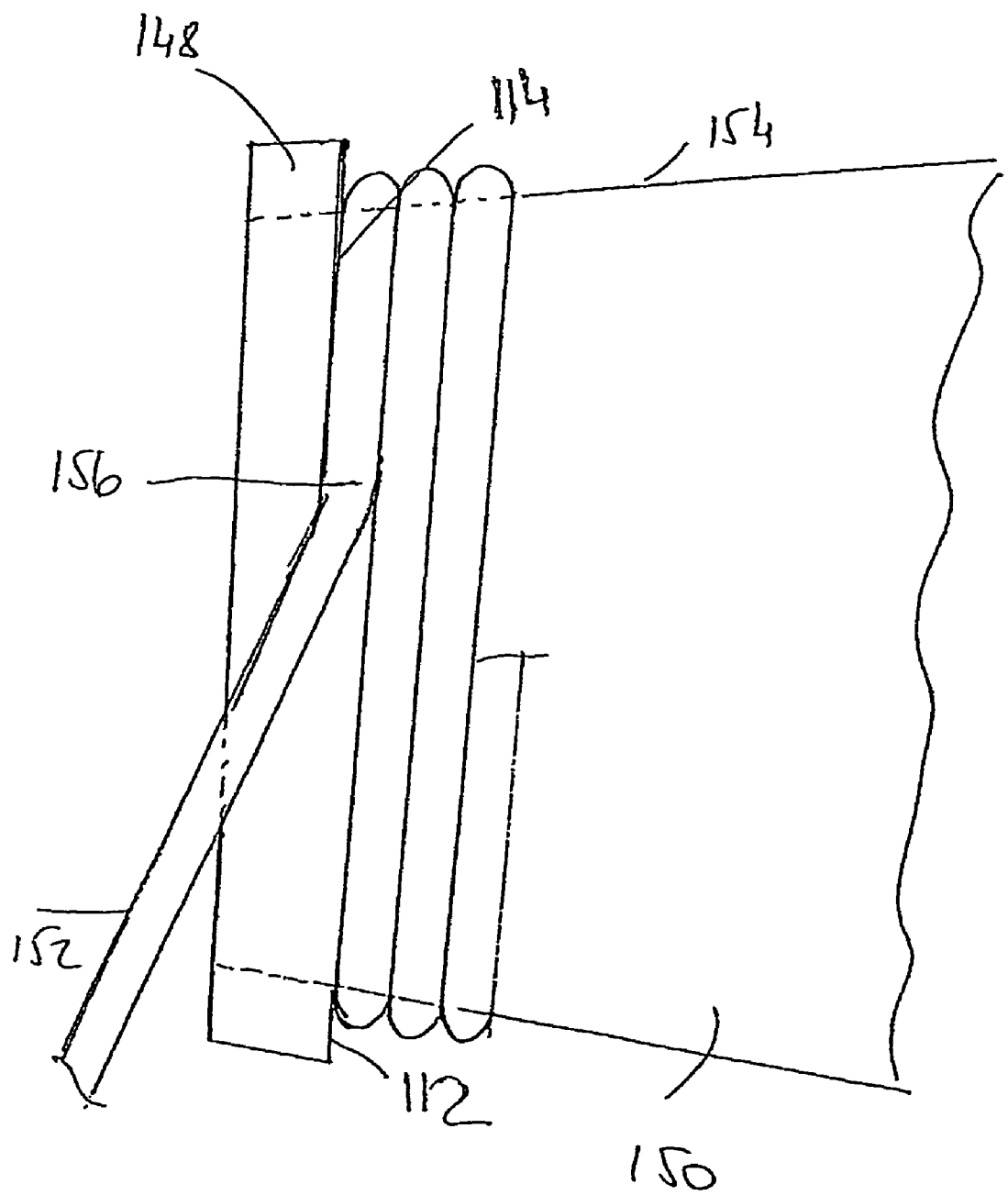
FIG. 4 shows the use of a helical fiber-guiding ring for guiding the first turns of a base layer of fiber around a smooth bobbin.

FIG. 4 shows the use of a helical fiber-guiding ring 148 attached to a smooth bobbin 150 for guiding the first turns of a base layer of a fiber 152. Fiber 152 is first inserted in the slot (not shown) of the ring, with the planned winding direction being clockwise (from bottom left to top right). At a point 156, fiber 152 exits the slot and joins helical path 114, being guided in a clockwise direction around the conical envelope of bobbin 150. The conical shape ensures that the first fiber turn is pushed toward the internal (on the bobbin side) surface of the guiding ring. A base layer is wound from the aft to the front edge of the bobbin, i.e. from left to right in FIG. 4. The conical shape of the bobbin ensures that the following turns of the fiber are closely attached and follow the same path as the first turn. Thus, the entire base layer is thus formed through the guiding of the first turn by ring 104. After the winding of the base layer is completed, the base layer is a template for the second layer, the second layer is a template for the third, etc. That is, each layer is a template for the layer directly above it.

In a preferred embodiment, ring 104 is a separate ring attachable to a bobbin by any known means such as bonding using various bonding techniques. For example, the ring can be glued to the bobbin, or matching threads can be provided in ring and bobbin for mutual attachment. Different rings with different slot sizes can be used with the same bobbin to wind different diameter fibers. In this case, significant savings are achieved by using one type of bobbin and different attachable rings for different fiber sizes. In another preferred embodiment, ring 104 may be an integral part of the bobbin, i.e. machined integrally with the bobbin. When separate, ring 104 is made preferably of the same material as the bobbin, e.g. hard resin, plastic, metal, etc. to prevent any mismatch or stress induced by such factors as temperature. During the winding of the base layer, an adhesive is applied among the individual windings and between the windings and the bobbin. The adhesive fixes the base layer to the bobbin. Upon completion, the base layer serves as guiding layer to a second layer, which is wound in the same clockwise direction but from right to left in FIG. 4, i.e. from the front to the aft of the bobbin. Additional layers are wound in the same sequence, e.g. the third layer from left to right guided by the second layer, the fourth layer from right to left, guided by the third layer, and so on.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

While the invention has been described with respect to a limited number of embodiments, it will be appreciated that many variations, modifications and other applications of the invention may be made. In particular, although the invention was described in the context of optical fibers, it should be appreciated that it is equally applicable to any fiber-like structure that needs guiding when wound, spooled or coiled on a smooth guiding surface.

What is claimed is:

1. A method of guiding the winding of a fiber around a smooth conical surface comprising the steps of:
    a. providing a helically guiding ring, said ring attachable to the smooth conical surface; and
    b. using said helically guiding ring and the smooth conical surface for guiding the winding of the fiber around the smooth conical surface in its initial first turn on the smooth conical surface.

2. The method of claim 1, wherein said step of providing, a helically guiding ring includes providing a ring integrated with the smooth conical surface.

3. The method of claim 1, wherein said step of providing a helically guiding ring includes providing a separate ring attachable to the smooth conical surface.

4. The method of claim 1, wherein the smooth conical surface is an external surface of a bobbin, and wherein said fiber is an optical fiber.

* * * * *